US009352670B2

(12) United States Patent
Zeimis, III (10) Patent No.: US 9,352,670 B2
(45) Date of Patent: May 31, 2016

(54) FOLD AND KNEEL SEAT WITH REARWARD FOLDING MOTION (71) Applicant: Peter Paul Zeimis, III, Shelby Township, MI (US)

(72) Inventor: Peter Paul Zeimis, III, Shelby Township, MI (US)

(73) Assignee: Magna Seating Inc., Aurora, Ontario (CA)

( * ) Notice: Subject to any disclaimer, the term of this patent is extended or adjusted under 35 U.S.C. 154(b) by 0 days.

(21) Appl. No.: 14/404,646

(22) PCT Filed: Jun. 3, 2013

(86) PCT No.: PCT/CA2013/000540
§ 371 (c)(1),
(2) Date: Dec. 1, 2014

(87) PCT Pub. No.: WO2013/177691
PCT Pub. Date: Dec. 5, 2013

(65) Prior Publication Data
US 2015/0158399 A1 Jun. 11, 2015

Related U.S. Application Data (60) Provisional application No. 61/654,204, filed on Jun. 1, 2012.

(51) Int. Cl.
*B60N 2/20* (2006.01)
*B60N 2/36* (2006.01)
*B60N 2/30* (2006.01)
(52) U.S. Cl.
CPC .............. *B60N 2/3065* (2013.01); *B60N 2/309* (2013.01); *B60N 2/3011* (2013.01); *B60N 2/3013* (2013.01)

(58) Field of Classification Search
CPC .... B60N 2/309; B60N 2/3011; B60N 2/3013; B60N 2/3065
USPC ............. 297/331, 334, 378.1, 378.12, 378.14
See application file for complete search history.

(56) References Cited

U.S. PATENT DOCUMENTS

| 3,304,044 | A | * | 2/1967 | Campbell | B60N 2/045 |
| | | | | | 297/334 X |
| 5,482,349 | A | | 1/1996 | Richter et al. | |
| 6,000,742 | A | | 12/1999 | Schaefer et al. | |
| 6,435,589 | B2 | * | 8/2002 | Shimizu | B60N 2/30 |
| | | | | | 297/334 X |
| 6,601,900 | B1 | * | 8/2003 | Seibold | B60N 2/0292 |
| | | | | | 297/334 X |
| 6,729,689 | B2 | * | 5/2004 | Habedank | B60N 2/01583 |
| | | | | | 297/331 X |

(Continued)

FOREIGN PATENT DOCUMENTS

EP 2028039 2/2009

*Primary Examiner* — Rodney B White
(74) *Attorney, Agent, or Firm* — Miller Canfield (57) ABSTRACT A seat comprises a seat cushion and a seat back pivotally coupled to the seat cushion. A linkage assembly moves the seat between a seating position and a kneeling position lowered rearwardly and downwardly against a floor. The linkage assembly includes a support bracket, a front leg coupled between the seat cushion and the support bracket, a rear leg extending between an upper end pivotally coupled to the seat back and a lower end pivotally coupled to the support bracket, the rear leg pivotally coupled to the rear portion of the seat cushion, and a control link extending between a first end pivotally coupled to the seat back and a second end pivotally coupled to the support bracket for guiding the seat cushion between the seating and kneeling positions in response to pivotal movement of the seat back between the upright and folded positions.

2 Claims, 6 Drawing Sheets

(56) References Cited

U.S. PATENT DOCUMENTS

| | | | | |
|---|---|---|---|---|
| 6,817,669 | B2 | 11/2004 | Roth et al. | |
| 6,857,703 | B2 * | 2/2005 | Bonk | B60N 2/01583 297/331 |
| 6,860,562 | B2 * | 3/2005 | Bonk | B60N 2/01583 297/331 |
| 6,899,392 | B1 * | 5/2005 | Saberan | B60N 2/206 297/334 X |
| 6,902,236 | B2 * | 6/2005 | Tame | B60N 2/206 297/331 |
| 6,964,452 | B2 * | 11/2005 | Kammerer | B60N 2/06 297/331 X |
| 7,040,684 | B2 * | 5/2006 | Tame | B60N 2/206 297/331 X |
| 7,210,740 | B2 | 5/2007 | Chintapudi et al. | |
| 7,255,399 | B2 * | 8/2007 | White | B60N 2/01583 297/334 X |
| 7,300,107 | B2 * | 11/2007 | Kammerer | B60N 2/0292 297/334 X |
| 7,328,929 | B2 * | 2/2008 | Epaud | B60N 2/3009 297/331 X |
| 7,350,867 | B2 | 4/2008 | Park | |
| 7,413,251 | B2 * | 8/2008 | Link | B60N 2/0705 297/334 |
| 7,497,517 | B2 * | 3/2009 | Gundall | B60N 2/206 297/334 X |
| 7,651,166 | B2 * | 1/2010 | Schwingenschlogel | B60N 2/06 297/334 |
| 7,686,389 | B2 * | 3/2010 | Yamada | B60N 2/3013 297/331 X |
| 7,686,397 | B2 * | 3/2010 | Sahi | B60N 2/12 297/334 |
| 7,766,430 | B2 * | 8/2010 | Ventura | B60N 2/22 297/334 X |
| 7,878,592 | B2 * | 2/2011 | Yamada | B60N 2/22 297/331 |
| 7,997,654 | B2 | 8/2011 | Ferry et al. | |
| 8,042,867 | B2 * | 10/2011 | Meister | B64D 11/064 297/334 X |
| 8,047,610 | B2 * | 11/2011 | Yamagishi | B60N 2/12 297/334 X |
| 8,066,326 | B2 * | 11/2011 | Hurst, III | B60N 2/3031 297/334 X |
| 8,096,616 | B2 * | 1/2012 | Ventura | B60N 2/206 297/334 X |
| 8,186,758 | B2 * | 5/2012 | Maier | B60N 2/3031 297/334 X |
| 8,251,450 | B2 * | 8/2012 | Carroll | B60N 2/01583 297/331 |
| 8,439,444 | B2 * | 5/2013 | Ngiau | B60N 2/12 297/331 |
| 8,474,910 | B2 * | 7/2013 | Kammerer | B60N 2/12 297/331 X |
| 8,579,374 | B2 * | 11/2013 | Epaud | B60N 2/3031 297/334 |
| 8,602,495 | B2 * | 12/2013 | Jeong | B60N 2/3013 297/334 |
| 8,616,642 | B2 * | 12/2013 | Sung | B60N 2/3013 297/334 |
| 8,833,853 | B2 * | 9/2014 | Kim | B60N 2/065 297/334 X |
| 8,844,998 | B2 * | 9/2014 | Kim | B60N 2/12 297/334 X |
| 8,882,197 | B2 * | 11/2014 | Line | B60N 2/2356 297/331 |
| 8,911,017 | B2 * | 12/2014 | Deptolla | B60N 2/3031 297/334 |
| 2002/0125753 | A1 * | 9/2002 | Kammerer | B60N 2/0292 297/331 |
| 2002/0130542 | A1 * | 9/2002 | Ellerich | B60N 2/01583 297/331 |
| 2010/0084903 | A1 * | 4/2010 | Kammerer | B60N 2/12 297/331 X |
| 2011/0115273 | A1 * | 5/2011 | Epaud | B60N 2/3031 297/378.1 |
| 2012/0038193 | A1 | 2/2012 | Hurst et al. | |

\* cited by examiner

FOLD AND KNEEL SEAT WITH REARWARD FOLDING MOTION

CROSS-REFERENCE TO RELATED APPLICATION

This application claims priority to and all the benefits of U.S. Provisional Application No. 61/654,204, filed on Jun. 1, 2012 and entitled "Fold and Kneel Seat with Rearward Folding Motion."

BACKGROUND OF THE INVENTION

1. Field of the Invention

The present invention relates to a seat assembly pivotal between an upright seating position and a folded position wherein a seat cushion is lowered and translated rearward to lie against the floor of an automotive vehicle and a seat back is pivoted forwardly lying flat along the seat cushion such that the seat back is clear from contact with a seat positioned forward of the seat assembly.

2. Description of Related Art

Seat assemblies for automotive vehicles include a generally horizontal seat cushion fixedly secured to the floor of the vehicle and a seat back pivotally coupled to the seat cushion. Rear seat assemblies, or $2^{nd}$ row seats, are positioned behind the front passenger and driver seat assemblies for providing additional vehicle seating capacity. It is commonly known and desirable for the seat back of the rear seat assembly to be pivotal between a generally upright seating position to a folded position overlying the seat cushion to provide additional storage capacity in the vehicle. The seat cushion may also kneel downwardly from the seating position spaced above the floor of the vehicle to a kneel position resting against the floor.

However, the space between the front seat assemblies and rear seat assemblies often prevents the seat back of the rear seat assembly from freely pivoting to the folded position without contacting the front seat assembly.

Therefore, it is desirable to provide a fold and kneel seating assembly wherein the seat back may be pivoted from the seating position to the folded position while the seat cushion moves downwardly and rearwardly from the seating position to a kneeling position and provide clearance of the seat back from contacting the front seat assembly.

SUMMARY OF THE INVENTION

According to one embodiment of the present invention, a seat assembly is provided for use in an automotive vehicle. The seat assembly comprises a seat cushion extending between a front portion and a rear portion and a seat back pivotally coupled to the seat cushion for pivotal movement between an upright seating position and a folded position overlying the seat cushion. A linkage assembly moves the seat assembly between a seating position spaced above a floor of the vehicle and a kneeling position lowered rearwardly and downwardly adjacent the floor. The linkage assembly includes a support bracket extending longitudinally between a first end and opposite second end, a front leg operatively coupled between the front portion of the seat cushion and the first end of the support bracket, a rear leg extending between an upper end pivotally coupled to the seat back and a lower end pivotally coupled to the second end of the support bracket, the rear leg pivotally coupled to the rear portion of the seat cushion between the upper and lower end, and a control link extending between a first end pivotally coupled to the seat back and a second end pivotally coupled to the support bracket for guiding the seat cushion between the seating and kneeling positions in response to pivotal movement of the seat back between the upright and folded positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
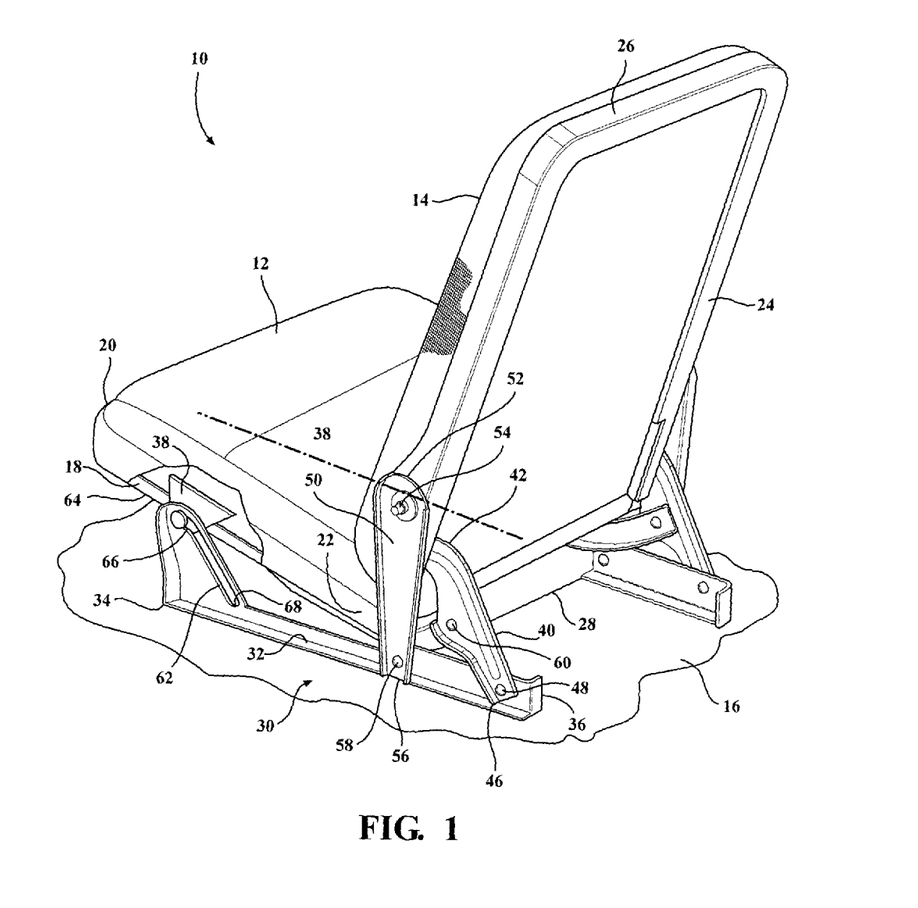
FIG. 1 is a fragmentary perspective view of a fold and kneel seat assembly according to a first embodiment of the invention in a seating position.
Figure 2:
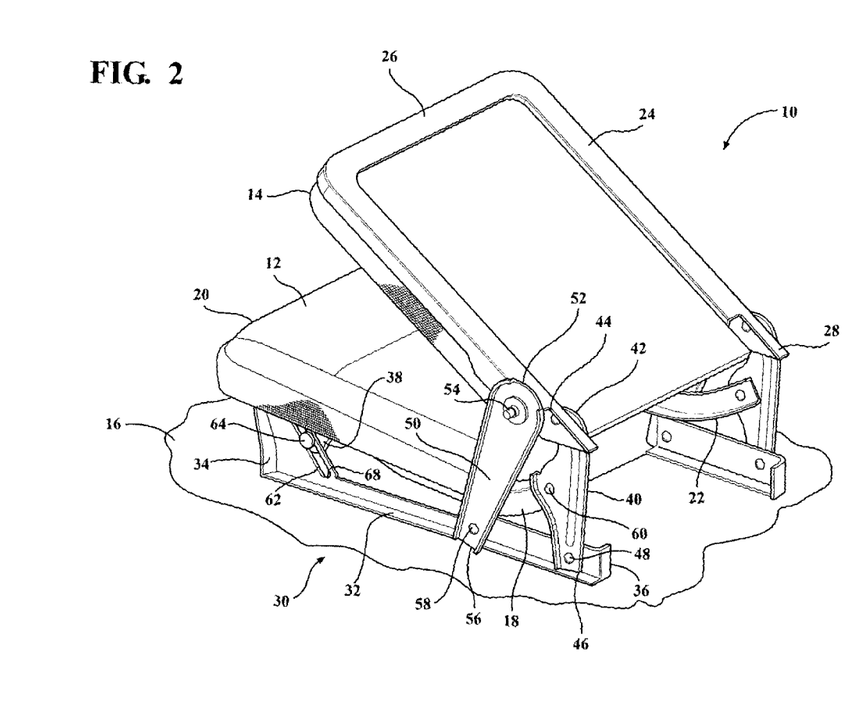
FIG. 2 is a perspective view of the seat assembly of FIG. 1 actuated between the seating position and a folded position.
Figure 3:
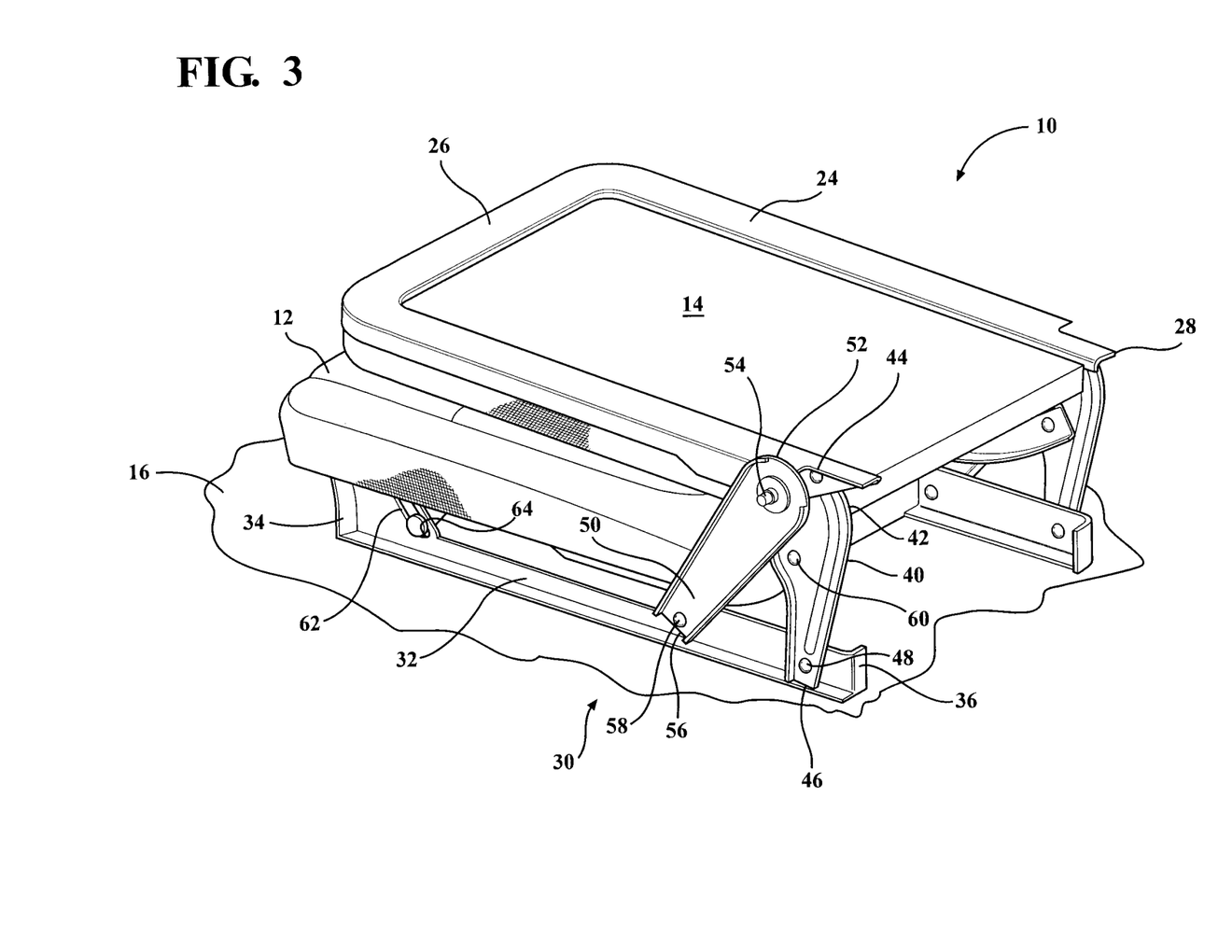
FIG. 3 is perspective view of the seat assembly of FIG. 1 in the folded position.

Referring to FIGS. 1-3, a fold and kneel seat assembly according to a first embodiment of the invention is shown at 10. The seat assembly 10 includes a generally horizontal seat cushion 12 and a generally upright seat back 14. The seat assembly 10 is selectively operable between a seating position, wherein the seat cushion 12 is spaced generally horizontally above a floor 16 of the vehicle and the seat back 14 is in a generally upright position as shown in FIG. 1, and a folded position, wherein the seat cushion 12 is lowered rearwardly against the floor 16 and the seat back 14 is pivoted forwardly overlying the seat cushion 12.

The seat cushion 12 includes a seat cushion frame 18 extending between a front portion 20 and a rear portion 22 for supporting a cellular foam pad encased in a trim cover as is commonly known in the art. Similarly, the seat back 14 includes a seat back frame 24 extending between a top portion 26 and a bottom portion 28 for supporting a cellular foam pad encased in a trim cover.

The seat assembly 10 is operable between the seating position and the folded position via a linkage assembly 30. A linkage assembly 30 is operatively coupled to each opposing lateral side of the seat assembly 10 in a mirror image. Therefore, only one linkage assembly 30 will be described in detail herein. The linkage assembly 30 includes a support bracket 32 extending longitudinally between a first end 34 and opposite second end 36 for supporting the seat assembly 10 on the vehicle floor 16. The support bracket 32 is adapted to be fixedly secured by fasteners, such as bolts, to the vehicle floor 16. The linkage assembly 30 further includes a front leg 38 extending downwardly from the bottom of the seat cushion 12 adjacent the front portion 20 of the seat cushion frame 18 for supporting the front portion 20 of the seat cushion 12 and a rear leg 40 for supporting the rear portion 22 of the seat cushion 12 and bottom portion 28 of the seat back 14. The rear leg 40 extends between a first upper end 42 pivotally coupled to the bottom portion 28 of the seat back frame 24 by pivot post 44 and an opposite second lower end 46 pivotally coupled to the support bracket 32 by pivot pin 48. The linkage assembly 30 also includes a control link 50 pivotally coupled between the bottom portion 28 of the seat back 14 and the support bracket 32. More specifically, the control link 50 extends between a first upper end 52 pivotally coupled to the bottom portion 28 of the seat back frame 24 by a recliner pivot 54 spaced above the pivot post 44 and an opposite second lower end 56 pivotally coupled to the second end 36 of the support bracket 32 by a pivot pin 58. The rear portion 22 of the seat cushion frame 18 is pivotally coupled to the rear leg 40 by pivot pin 60 spaced approximately midway between the first upper end 42 and second lower end 46 of the rear leg 40.

In the first embodiment of the invention, the first end 34 of the support bracket 32 includes an inclined slot 62 therein extending downwardly and rearwardly for slidably receiving a guide pin 64 projecting outwardly from the front leg 38. The inclined slot 62 extends rearwardly from a flat or horizontal detent portion 66 for supporting the guide pin 64 and front leg 38 with the seat assembly 10 in the seating position and then extends downwardly and rearwardly to a lower end 68 for supporting the guide pin 64 and lowering the seat cushion 12 rearward and downwardly against the floor 16 in the folded position.

In operation, referring to FIG. 1, the seat assembly 10 is shown in the seating position wherein the seat cushion 12 is spaced generally horizontally above the vehicle floor 16 and the seat back 14 is in a generally upright position. In the seating position, the guide pin 64 on the front leg 38 is seated in the flat detent portion 66 of the inclined slot. Also, the pivot post 44 of the rear leg 40 is in an over center condition wherein the pivot post 44 is forward of a straight line defined between the recliner pivot 54 and the pivot pin 48 in order to support the seat cushion 12 and seat back 14 in the seating position. Referring to FIG. 2, as the seat back 14 is pivoted forwardly from the upright seating position towards a fold flat position overlying the seat cushion 12, the bottom portion 28 of the seat back frame 24 forces the rear leg 40 to pivot clockwise about the pivot pin 48. Pivotal movement of the rear leg 40 about the pivot pin 48 pulls rearwardly on rear portion 22 of the seat cushion frame 18. The seat cushion 12 is guided rearwardly and downwardly by the guide pin 64 sliding along the inclined slot 62 from the flat detent portion 66 to the lower end 68. Therefore, as the seat back 14 is pivoted about the recliner pivot 54 between the upright seating position and the folded position, the rear leg 40 pivots clockwise and the pivot post 44 orbits about the recliner pivot 54 pulling the seat cushion 12 rearwardly. The guide pin 64 simultaneously travels along the inclined slot 62 to lower the seat cushion 12 from the seating position spaced above the floor to a kneeling position lying against the floor 16 as shown in FIG. 3.

Figure 4:
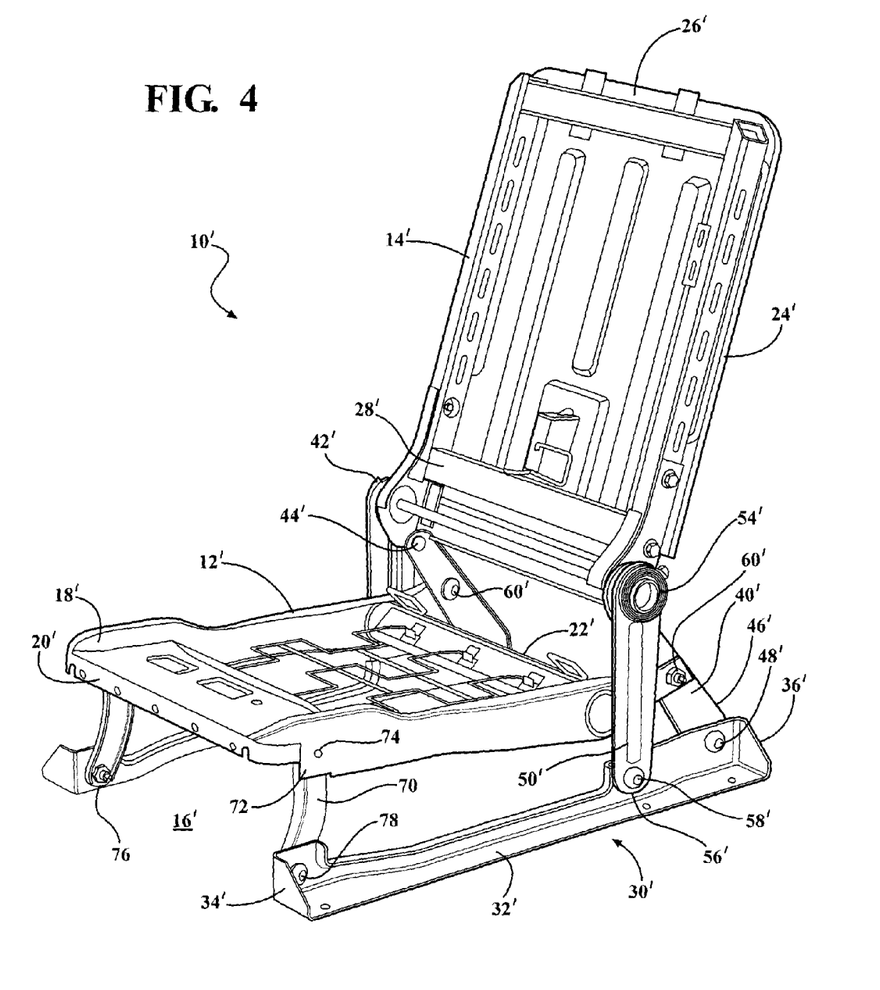
FIG. 4 is perspective view of a fold and kneel seat assembly according to a second embodiment of the invention in a seating position.
Figure 5:
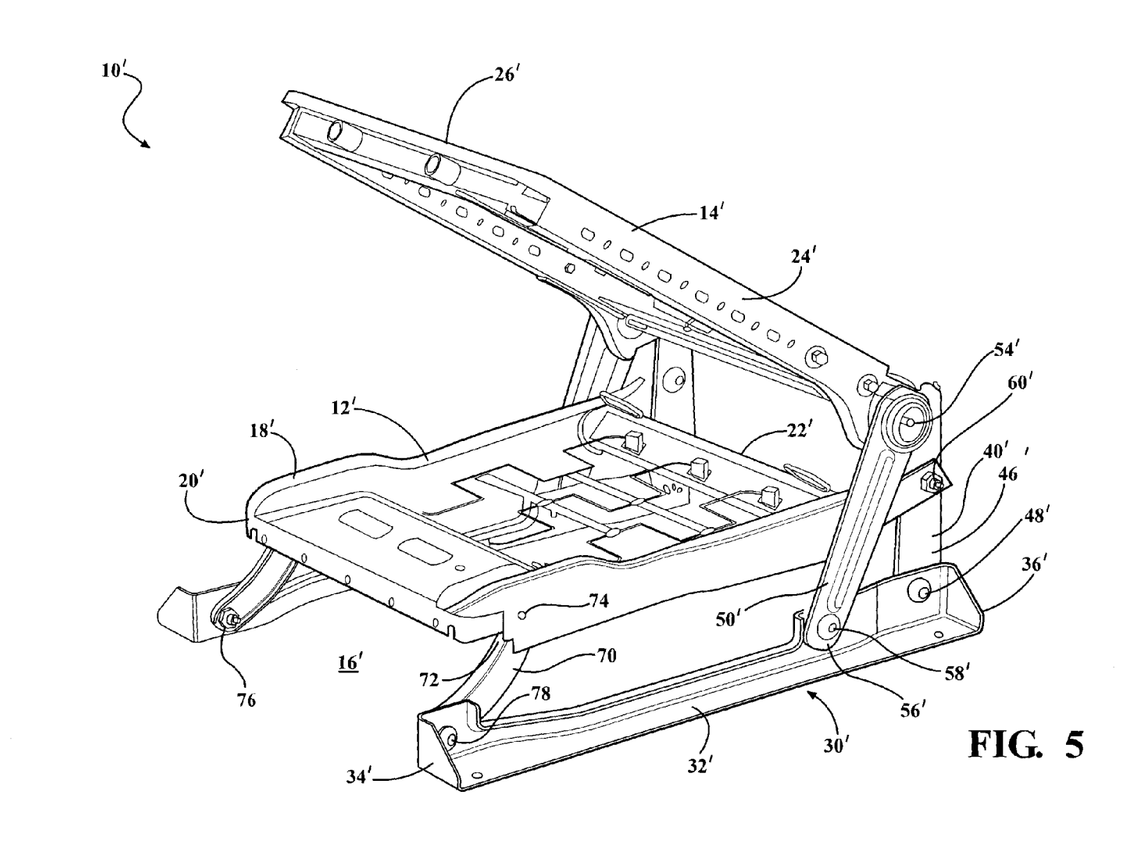
FIG. 5 is a perspective view of the seat assembly of FIG. 4 actuated between the seating position and a folded position.
Figure 6:
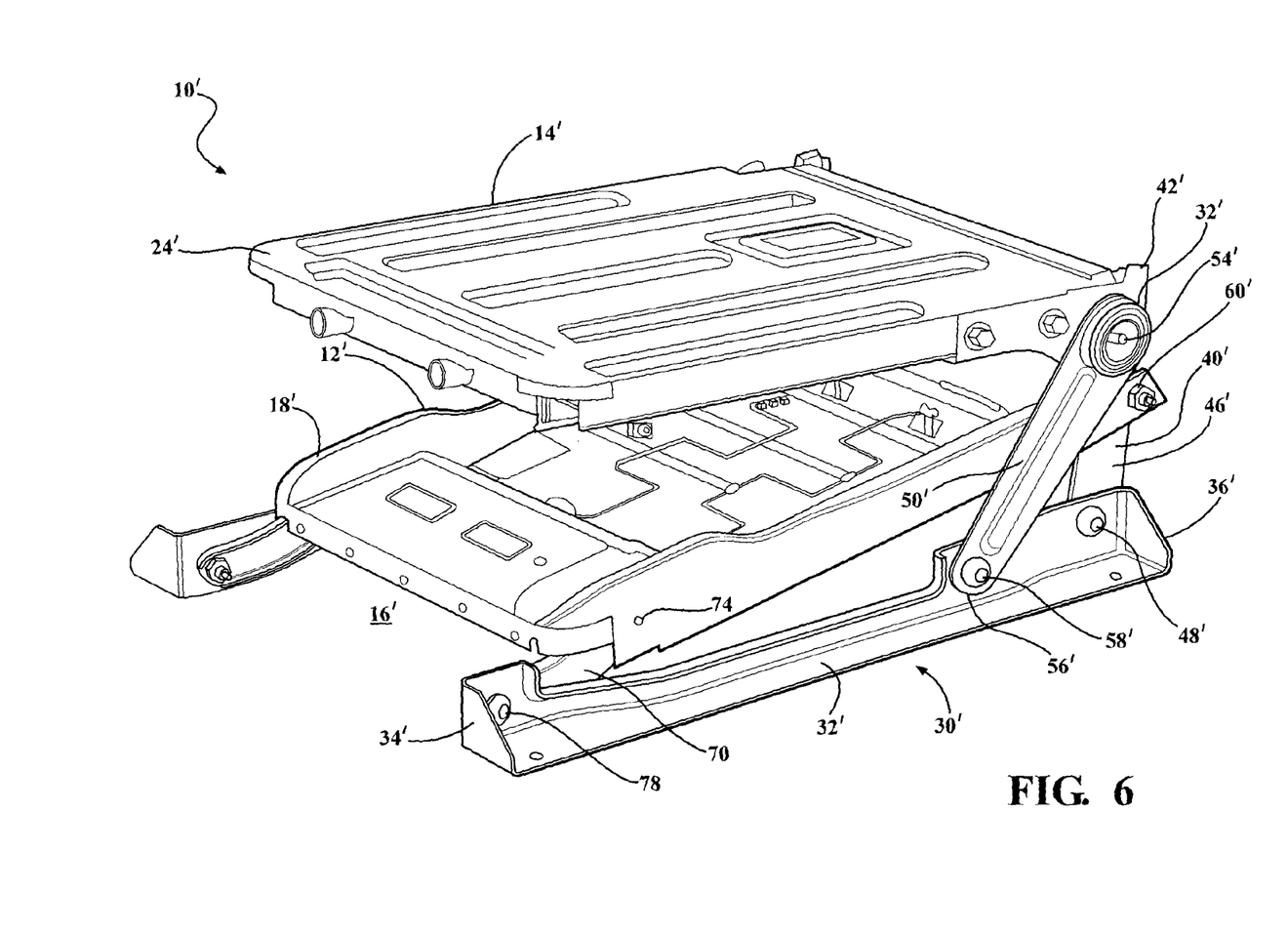
FIG. 6 is a perspective view of the seat assembly of FIG. 5 in the folded position.

Referring to FIGS. 4-6, a seat assembly 10' of a second embodiment of the invention is shown. The seat assembly 10' of the second embodiment similarly includes a seat cushion 12', a seat back 14', and a linkage assembly 30'. The linkage assembly 30' includes a support bracket 32' extending longitudinally between a first end 34' and opposite second end 36' for supporting the seat assembly 10' on the vehicle floor 16'. The linkage assembly 30 further includes a rear leg 40' for supporting the rear portion 22' of the seat cushion 12' and bottom portion 28' of the seat back 14'. The rear leg 40' extends between a first upper end 42' pivotally coupled to the bottom portion 28' of the seat back frame 24' by pivot post 44' and an opposite second lower end 46' pivotally coupled to the support bracket 32' by pivot pin 48'. The linkage assembly 30' also includes a control link 50' pivotally coupled between the bottom portion 28' of the seat back 14' and the support bracket 32'. More specifically, the control link 50' extends between a first upper end 52' pivotally coupled to the bottom portion 28' of the seat back frame 24' by a recliner pivot 54' spaced above the pivot post 44' and an opposite second lower end 56' pivotally coupled to the second end 36' of the support bracket 32' by a pivot pin 58'. The rear portion 22' of the seat cushion frame 18' is pivotally coupled to the rear leg 40' by pivot pin 60' spaced approximately midway between the first upper end 42' and second lower end 46' of the rear leg 40'.

In the second embodiment of the invention, the inclined slot 62 formed in the support bracket 32 is replaced with a front leg 70 having an upper end 72 pivotally coupled to the front portion 20' of the seat cushion frame 18' by pivot 74 and a lower end 76 pivotally coupled to the first end 34' of the support bracket 32' by pivot 78.

In operation, referring to FIG. 4, the seat assembly 10' is shown in the seating position wherein the seat cushion 12' is spaced generally horizontally above the vehicle floor 16' and the seat back 14' is in a generally upright position. In the seating position, the pivot post 44' of the rear leg 40' is in the over center condition in order to support the seat cushion 12' and seat back 14' in the seating position. Referring to FIG. 5, as the seat back 14' is pivoted forwardly from the upright seating position towards a fold flat position overlying the seat cushion 12', the bottom portion 28' of the seat back frame 24' forces the rear leg 40' to pivot clockwise about the pivot pin 48'. Pivotal movement of the rear leg 40' about the pivot pin 48' pulls rearwardly on rear portion 22' of the seat cushion frame 18'. The seat cushion 12' is guided rearwardly and downwardly by the front leg 70. Therefore, as the seat back 14' is pivoted about the recliner pivot 54' between the upright seating position and the folded position, the rear leg 40' pivots clockwise and the pivot post 44' orbits about the recliner pivot 54' pulling the seat cushion 12' rearwardly. The front leg 70 simultaneously pivots rearwardly and downwardly to lower the seat cushion 12' from the seating position spaced above the floor to a kneeling position lying against the floor 16' as shown in FIG. 6.

The invention has been described herein in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for use in an automotive vehicle comprising:

a seat cushion extending between a front portion and a rear portion; a seat back pivotally coupled to said seat cushion for pivotal movement between an upright seating position and a folded position overlying said seat cushion; and a linkage assembly for moving said seat assembly between a seating position spaced above a floor of the vehicle and a kneeling position lowered rearwardly and downwardly adjacent the floor;

said linkage assembly including a support bracket extending longitudinally between a first end and opposite second end, a front leg operatively coupled between said front portion of said seat cushion and said first end of said support bracket, a rear leg extending between an upper end pivotally coupled to said seat back and a lower end pivotally coupled to said second end of said support bracket, said rear leg pivotally coupled to said rear portion of said seat cushion between said upper and lower end, and a control link extending between a first end pivotally coupled to said seat back and a second end pivotally coupled to said support bracket for guiding said seat cushion between said seating and kneeling positions in response to pivotal movement of said seat back between said upright and folded positions;

wherein said control link is pivotally coupled to the seat back by a recliner pivot and said upper end of said rear leg is pivotally coupled to said seat back by a pivot post spaced below said recliner pivot; and wherein said front leg includes a guide pin projecting therefrom and said first end of said support bracket includes an inclined slot formed therein for slidably receiving said guide pin for guiding said seat assembly between said seating and positions.

2. A seat assembly as set forth in claim 1 wherein said inclined slot extends between a flat detent portion for receiving said guide pin and supporting said front leg and seat cushion in said seating position and a lowered end angled downwardly and rearwardly for guiding said front leg and seat cushion to said kneeling position.

* * * * *